Dec. 10, 1963          S. J. HOWARD          3,113,334
                    WINDSHIELD WIPER SYSTEM
Filed Jan. 17, 1962                          2 Sheets-Sheet 2
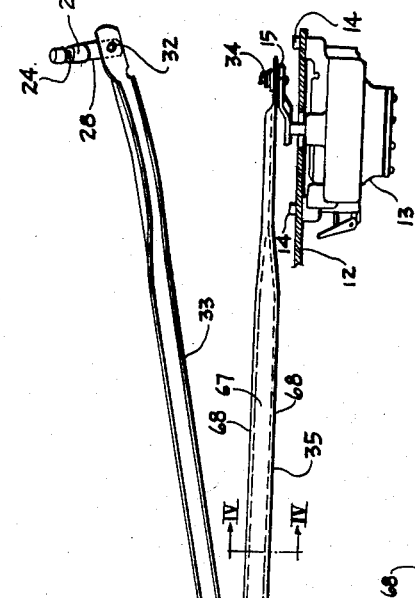
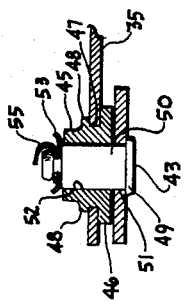
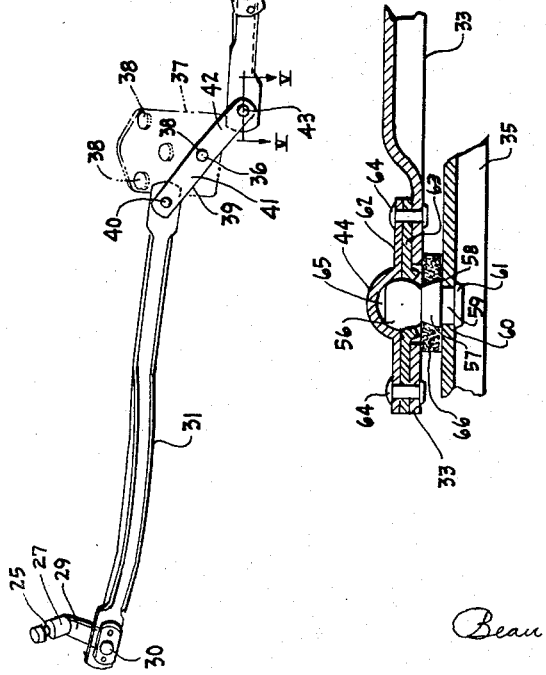
INVENTOR.
SHELDON J. HOWARD
BY
Bean Brooks Buckley & Bean
ATTORNEYS

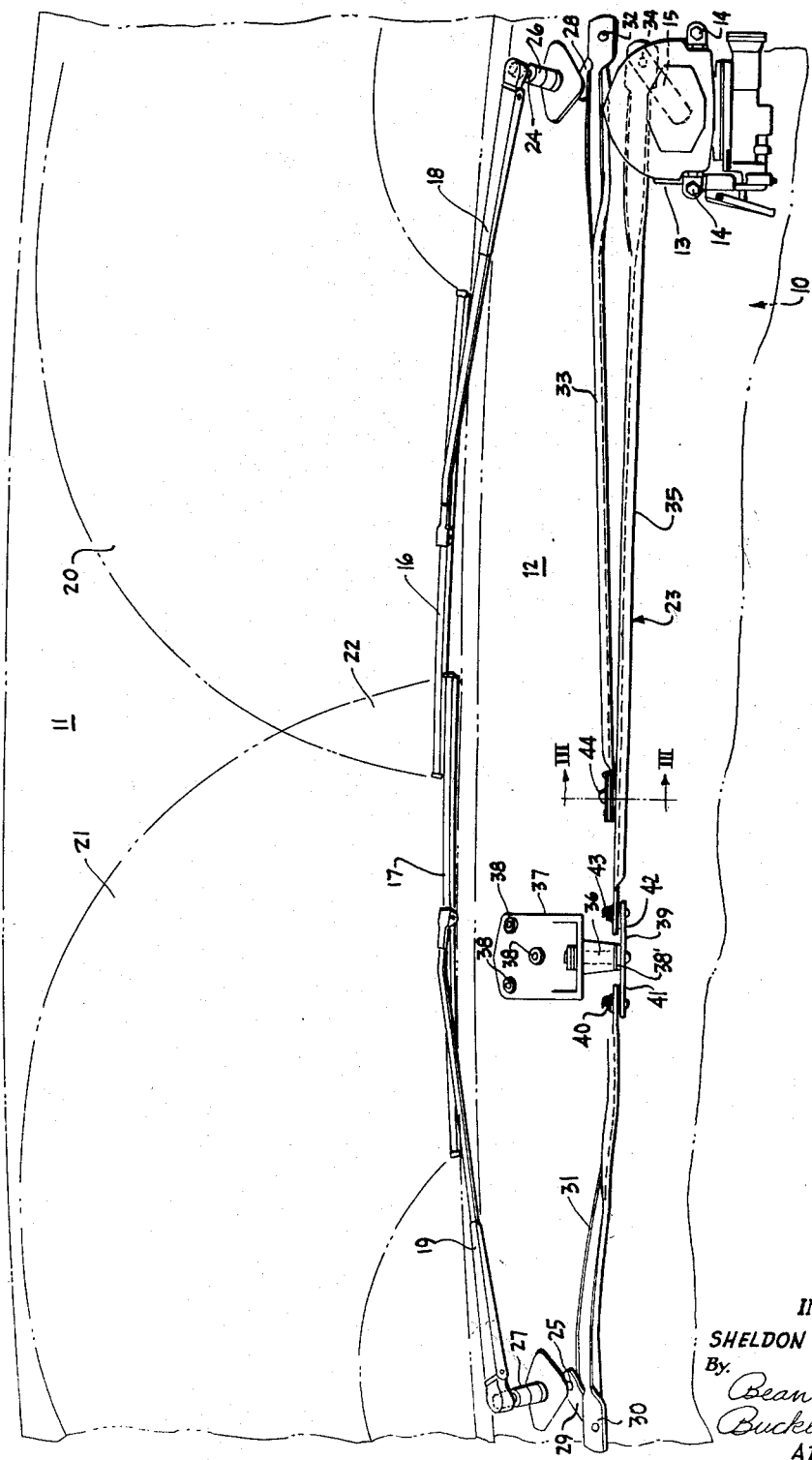

United States Patent Office 3,113,334
Patented Dec. 10, 1963

3,113,334
WINDSHIELD WIPER SYSTEM
Sheldon J. Howard, Buffalo, N.Y., assignor to Trico Products Corporation, Buffalo, N.Y.
Filed Jan. 17, 1962, Ser. No. 166,769
7 Claims. (Cl. 15—250.14)

The present invention relates to an improved windshield wiper linkage for a windshield wiper system of an automotive vehicle.

Heretofore the wiper motor for a vehicle windshield wiper system was usually centrally located on the fire wall underneath the vehicle windshield. However, this type of mounting has been found to interfere with the use of an elongated plenum chamber underneath the windshield which is used for ventilating and air conditioning. This interference is especially aggravated by the larger wiper motors which are now being used for driving longer wiper blades across windshields of increased sizes. It has, therefore, become necessary in certain instances to relocate the wiper motor from its previous position centrally of the fire wall to a position on the side of the fire wall so that the above noted interference is eliminated.

Notwithstanding that it has become necessary to relocate the wiper motor to the side of the vehicle for the above reasons, it is important to obtain the usual desirable features of a wiper system, namely, low inertia by the use of relatively lightweight linkages, minimum deflection of the links between the wiper motor and the wipers thereby minimizing both the buckling thereof and the vibration resulting from such buckling, and little relative movement between various portions of the wiper linkage to thereby minimize noise and the wear therebetween. Furthermore, where the wipers are parked in an overlapping relationship at the central portion of the windshield with one wiper having an overlying position and the other wiper having an underlying position, it is necessary that the wiper system possess a fast pullaway type of action wherein the overlying wiper moves out of its parked position at a higher rate of speed than the underlying wiper to thereby avoid entangling engagement therebetween. It is with the providing of the foregoing desirable features in a windshield wiper system which has the wiper motor located to the side of the vehicle that the present invention is concerned.

It is accordingly one object of the present invention to provide a windshield wiper system wherein the wiper motor is located at the side portion of the vehicle and which produces a positive drive between the wiper motor and the wipers by minimizing the buckling or deflection of the linkages thereby tending to obviate the vibration of the linkage which accompanies such buckling, which utilizes lightweight linkages in order to reduce the inertia of the system, which provides a small amount of relative movement between certain parts of the system to thereby promote their longevity, and which provides a fast pullaway type of action of an overlying wiper from an underlying wiper in an extremely simple and expeditious manner.

It is another object of the present invention to provide a windshield wiper linkage wherein the parts are associated in a unique manner so that one strategically located element performs a multiplicity of functions, namely, permits the use of relatively lightweight linkages in the remainder of the linkage system, eliminates the tendency for the linkage to vibrate, provides a fast pullaway type of action for an overlapping type of wiper set, and converts the motion provided by the wiper motor, which is located at the side of the vehicle, into an opposed type of motion of the wipers. Other objects and intended advantages of the present invention will readily be perceived hereafter.

The linkage of the present invention is for use with a wiper motor which is mounted off to the side of the vehicle. A stub shaft mounting a lever is strategically located in the central one-third area between the wiper rockshafts. Because of the strategic location of the stub shaft and lever in the foregoing manner, the above enumerated objects of the present invention are realized, as explained in detail hereafter. A first elongated link extends between one end of said lever and one of the crankarms which is affixed to one of the rockshafts of the linkage. The other crankarm and the wiper motor which is adjacent thereto each have an elongated link pivotally connected to them which extends toward and are effectively pivotally mounted on the other end of said lever which is mounted on said stub shaft in said central region. Because the stub shaft is located in the central third of the distance between the rockshafts, the above mentioned elongated links are relatively short, that is, they are shorter than if they extended the entire distance between the crankarms. This permits them to be made of relatively lightweight materials while restricting their buckling or deflection to a minimum amount, this minimum buckling or deflection reducing the tendency for the linkages to whip and vibrate. The fact that these links are lightweight also reduces the inertia of the system. Because certain of the elongated links which are connected to each other extend in substantially the same direction, there is very little relative movement therebetween, which enhances the life of the bearings through which they are connected. In addition to providing the foregoing advantages, the centrally located lever on said stub shaft reverses the motion between the wiper motor and one of the wipers to thereby permit the wiper system to provide a desirable opposed motion type of operation. Furthermore, the above noted lever has the portions thereof extending from the opposite sides of the stub shaft oriented at an angle relative to each other. By this, a fast pullaway type of action is obtained so that wipers which are parked in an overlapping relation at the central portion of a windshield can be placed in movement without the possibility of their becoming entangled with each other. More specifically in the foregoing respect, the portion of the lever which effectively drives the overlying wiper has a greater component of horizontal movement when the wiper system is actuated from a parked position than the portion of the lever which effectively drives the underlying wiper. This will cause the overlying wiper to move at a greater rate of speed from its parked position than the underlying wiper, thereby obviating the tendency of the wipers to become entangled with each other. Thus, because of the strategic location of the stub shaft and the lever mounted thereon, the linkage of the present invention permits the use of a wiper motor mounted in a lateral area of the vehicle while providing a drive to the wipers with a minimum deflection in the various linkages by permitting the breaking up of the links into relative short lengths. Because the linkages are relatively short, they can be made of a lighter weight than if they were longer, this feature reducing the inertia of the system. Furthermore, the strategically located lever mounted on said stub shaft is also used to provide an opposed type of wiper motion having a fast pullaway action which prevents entangling engagement between overlying and underlying wipers moving from a parked position at the central portion of the windshield. The present invention will be more fully understood when the following portions of the specification are read in conjunction with the accompanying drawings wherein:

FIG. 1 is a fragmentary perspective elevational view of an automotive vehicle mounting the improved wiper system of the present invention;

FIG. 2 is a perspective plan view of the linkage of the wiper system shown in FIG. 1;

FIG. 3 is a detail view of a bearing arrangement which is used in the linkage, this view being taken along line III—III of FIG. 1;

FIG. 4 is a cross sectional detail view of the construction of the linkages taken on line IV—IV of FIG. 2; and FIG. 5 is a detail view of the pin connection between certain portions of the linkages taken along line V—V of FIG. 2.

In FIG. 1 an automotive vehicle 10 is shown, having a windshield 11 mounted thereon in the usual manner above fire wall 12. A plenum chamber (not shown) is mounted below the linkage, which is to be described hereafter. A wiper motor 13 is suitably mounted on side portion of fire wall 12 by means of bolts 14. This motor is of the hydraulic type but it is to be readily understood that the motor may be of any other conventional type known in the art. During wiper motor operation, crankarm 15 thereof will oscillate to cause corresponding oscillation of wipers 16 and 17 which are mounted on wiper arms 18 and 19, respectively, to provide the wipe patterns 20 and 21, respectively, having an overlapping central portion 22 at the center of the windshield.

The motion which originates at wiper motor 13 is transmitted to wipers 16 and 17 through linkage 23. This linkage includes rockshafts 24 and 25 journalled in bearings 26 and 27, respectively, which are mounted on the cowl of the vehicle and have wiper arms 18 and 19, respectively, mounted on their outer ends. Fixedly secured to the inner ends of rockshafts 24 and 25 are first ends of crankarms 28 and 29, respectively. A ball joint 30 (which may be of the type described in detail hereafter) pivotally mounts one end of elongated link 31 to a second end of crankarm 29. A pin connection 32 (of the type which is to be described in detail hereafter) pivotally mounts one end of elongated link 33 to the second end of crankarm 28. A pin connection 34 pivotally secures one end of elongated link 35 to the outer end of crankarm 15 at wiper motor 13.

In accordance with the present invention, a strategically located linkage is provided consisting of stub shaft 36 journalled for rotation in bracket 37 mounted on the vehicle fire wall 12 by bolts 38, said stub shaft 36 mounting lever 39 at its outer end. A washer 38' is located between lever 39 and the end of the bracket 37 which journals stub shaft 36.

Because stub shaft 36 is located in the central one-third of the distance between rockshafts 24 and 25, elongated links 31, 33 and 35 are relatively short. The fact that these links are relatively short permits them to be made of relatively lightweight materials and also minimizes their deflection during wiper motor operation. The end of link 31 which is remote from crankarm 29 is pivotally secured to lever 39 by pin assembly 40 which is at the end of lever portion 41 to one side of stub shaft 36. The end of elongated link 35 which is remote from crankarm 15 is secured to the portion 42 of lever 39 by pin assembly 43, level portion 42 lying on the opposite side of stub shaft 36 from lever portion 41. Elongated link 33 has the end thereof which is remote from crankarm 28 attached to elongated link 35 by ball joint 44 in the vicinity of pivot assembly 43. Because of the foregoing orientation, elongated links 33 and 35 extend in substantially the same direction and, therefore, there is a small amount of relative pivotal movement therebetween at ball joint 44 when the linkage is in operation. This arrangement promotes the longevity of ball joint 44.

It can readily be appreciated that lever 39 not only permits the wiper linkages to be shortened in the above described manner, but also effects a reversal of the motion produced by wiper motor 13 to thereby cause wipers 16 and 17 to operate in an opposed relationship. It is to be further noted that lever portion 39, lying to the left of stub shaft 36 in FIGS. 1 and 2, has its longitudinal axis extending at an angle to the longitudinal axis of lever portion 42 which extends to the right of stub shaft 36. Because of the foregoing orientation, lever portion 42 has a greater components of horizontal movement than lever portion 41 when the movement of the wipers is commenced from the parked position shown in FIG. 1. Since lever portion 42 is effectively coupled to overlying wiper 16, the foregoing greater component of horizontal movement causes overlying wiper 16 to move at a greater rate of speed from its parked position than underlying wiper 17 which is effectively coupled to lever portion 41, which does not have as great a component of horizontal movement as does lever portion 42. The foregoing orientation between lever portions 41 and 42, by giving a greater speed of movement to overlying wiper 16 during the initial portion of its travel from a parked position than underlying wiper 17, thereby prevents entangling engagement therebetween during the initial phase of their movement through the overlapping wipe pattern 22.

It is to be noted that movement of elongated link 35 extending between lever 39 and wiper motor 13 is confined to a single plane, thereby permitting pivot pins 34 and 43 to be used at the opposite ends of link 35. Pivot pins 34 and 43 may have the construction shown in FIG. 5. More specifically, a bearing 45 has a shoulder 46 formed thereon for abutting engagement with the end of elongated link 35 and is staked into position in aperture 47 of link 35 by staked-over portions 48. Pin 43 has a head 49 and central portion 50 of pin 43 fits through apertures 51 and 52 in lever 39 and link 35, respectively. A spring washer 53 is inserted over a reduced end portion (not numbered) of pin 43 remote from head 49, and receives a clip 55 to thereby retain the pin in position in apertures 51 and 52. Pins 40, 32 and 34 have the same structure as pin 43 described above. As noted above, since movement of elongated link 35 is confined to a single plane, pin assemblies such as 43 may be used at both ends thereof to thereby limit the cost of the linkage.

Ball joints are provided at 44, between elongated links 33 and 35, and at 30 between elongated link 31 and crankarm 29 to compensate for any lateral movement experienced in the linkage during operation. Ball joint 44 (FIG. 3) includes a ball member 56 having a tail 57 with a shoulder 58. A reduced end portion 59 fits in aperture 60 of link 35 and peened-over portion 61 firmly secures the ball 56 to link 35 between it and shoulder 58. Ball 56 is located within bearing plates 62 and 63 by rivets 64 which secure said bearing plates to elongated link 33. Ball 56 is cut away in its upper portion to provide a recess 65 under plate 62 for receiving a grease. A pad of felt, or the like, 66, is located between link 35 and link 33 to retain the grease in chamber 65. Ball joint 30 is of the same construction as ball joint 44 described above.

As can be seen from FIG. 4 elongated link 35 is of channel shaped configuration in the central portion thereof with a base portion 67 and upturned sides 68. The channel shaped configuration imparts rigidity to the elongated links and thereby minimizes bending and twisting thereof. The end portions of link 35 proximate the pin connections 34 and 43 are flat as shown in the drawings to permit the above described pin attachment. Elongated links 33 and 31 have a similar construction to link 35 described above.

The use of the centrally located stub shaft and lever permits elongated links 31, 33, and 35 to be shorter than if links were used which extended substantially the entire distance between the crankarms. Because these links are relatively short, they deflect or buckle a minimum amount during wiper operation which, in turn, reduces the tendency of the links to whip and spring excessively, such excessive whipping resulting in undesirable vibration. More specifically, if excessive deflection or buckling of the elongated links were experienced during wiper operation, there would be a tendency for such deflected or buckled links to return to their original condition when the force producing such deflection was removed and thus produce a whipping motion which would be accompanied by undesirable vibration and noise. Thus, by minimizing the buckling or deflection of the linkages, there is a corresponding reduction of the above described vibration.

It can thus be seen that the improved linkage of the present invention is manifestly capable of achieving the above enumerated objects and while a preferred embodiment of the present invention has been disclosed, it is to be readily understood that it is not limited thereto, but may be otherwise embodied within the scope of the following claims.

What is claimed is:

1. A windshield wiper linkage comprising first and second rockshafts located proximate opposite side portions of a windshield, first and second crankarms coupled to said first and second rockshafts, respectively, a first elongated link having a first end thereof pivotally connected to said first crankarm, a second elongated link having a first end thereof pivotally connected to said second crankarm, a third elongated link having a first end thereof adapted to be pivotally connected to the output of a wiper motor located adjacent said second crankarm, a stub shaft journaled for rotation in the central area between said first and second rockshafts, a lever having a central portion thereof mounted on said stub shaft, a first pivotal connection between a first end of said lever and the second end of said first elongated link, a second pivotal connection between said second end of said lever and said second end of said third elongated link, and a third pivotal connection between said second end of said second elongated link and said third elongated link, said third pivotal connection being proximate to but spaced from said second pivotal connection along said third elongated link, whereby said location of said stub shaft in said central area permits said first, second, and third elongated links to be relatively short to thereby minimize the deflection thereof during operation and whereby the location of said third pivotal connection between said second and third elongated links minimizes the relative pivotal movement between said second and third links, said lever also causing wipers carried by said first and second rockshafts to operate in opposed relationship.

2. A windshield wiper linkage as set forth in claim 1 wherein said lever has a first portion with a first longitudinal axis extending to one side of said stub shaft and wherein said lever has a second portion with a second longitudinal axis extending to the other side of said stub shaft, said first and second axes lying at an angle to each other to thereby cause a wiper carried by one of said rockshafts to travel at a higher rate of speed from its parked position than a wiper carried by the other of said rockshafts.

3. A windshield wiper system comprising first and second rockshafts located proximate opposite side portions of a windshield, first and second wiper arms mounted on said first and second rockshafts, respectively, first and second wipers mounted on said first and second wiper arms, respectively, first and second crankarms coupled to said first and second rockshafts, respectively, a wiper motor mounted adjacent said second crankarm, a third crankarm on said wiper motor, a first elongated link having a first end thereof pivotally connected to said first crankarm, a second elongated link having a first end thereof pivotally connected to said second crankarm, a third elongated link having a first end thereof pivotally connected to said third crankarm, a stub shaft journaled for rotation in the central area between said first and second rockshafts, a lever having a central portion thereof mounted on said stub shaft, said lever having a first portion extending to one side of said stub shaft and a second portion extending to the other side of said stub shaft, a first pivotal connection between said first portion of said lever and the second end of said first elongated link, a second pivotal connection between said second portion of said lever and said second end of said third elongated link, and a third pivotal connection between said second end of said second elongated link and said third elongated link, said third pivotal connection being proximate to but spaced from said second pivotal connection along said third elongated link, whereby the location of said stub shaft in said central area permits said first, second, and third elongated links to be relatively short to thereby minimize their deflection during operation of said wiper system and whereby the location of said third pivotal connection between said second and third elongated links minimizes the relative pivotal movement between said second and third links, said lever also causing said wipers carried by said wiper arms to operate in opposed relationship.

4. A windshield wiper system as set forth in claim 3 wherein said first portion of said lever has a first longitudinal axis and wherein said second portion of said lever has a second longitudinal axis extending at an angle to said first longitudinal axis and wherein said first and second wipers are adapted to park in overlapping relationship at the central portion of a windshield, said angular relationship between said first and second portions of said lever causing the overlying wiper to move from its parked position at a greater rate of speed than said underlying wiper to thereby prevent entangling engagement between said wipers when said wiper system is actuated.

5. A windshield wiper system as set forth in claim 4 wherein the portion of said lever which is effectively coupled to said overlying wiper has a greater component of horizontal movement during the initial stages of wiper movement than the portion of said lever which is effectively coupled to said underlying wiper.

6. A windshield wiper linkage comprising first and second rockshafts located proximate opposite side portions of a windshield, first and second crankarms coupled to said first and second rockshafts, respectively, a first elongated link having a first end thereof pivotally connected to said first crankarm, a second elongated link having a first end thereof pivotally connected to said second crankarm, a third elongated link having a first end thereof adapted to be pivotally connected to the output of a wiper motor located adjacent said second crankarm, a stub shaft journaled for rotation in the central area between said first and second rockshafts, a lever having a central portion mounted on said stub shaft, a first pivotal connection between a first end of said lever and second end of said first elongated link, a second pivotal connection on a second end of said lever for effective driving relationship by said third elongated link, and a third pivotal connection between said second and third elongated links, said third pivotal connection being proximate said second pivotal connection but lying between said second pivotal connection and said second crankarm, whereby said location of said stub shaft and said first, second, and third pivotal connections permits said first, second, and third elongated links to be relatively short to thereby minimize the deflection thereof during operation and whereby said location of said third pivotal connection minimizes the relative pivotal movement between said second and said third links, said lever also causing wipers carried by said first and second rockshafts to operate in opposed relationship.

7. A windshield wiper linkage as set forth in claim 6 wherein said first and third pivotal connections on said lever are out of alignment with the axis of said stub shaft to thereby cause a wiper carried by one of said rockshafts to travel at a higher rate of speed from its parked position than a wiper carried by the other of said rockshafts.

References Cited in the file of this patent

UNITED STATES PATENTS 3,025,552  Contant _____ Mar. 20, 1962

FOREIGN PATENTS 48,939  France _____ June 21, 1938
832,466  Great Britain _____ Apr. 13, 1960
853,835  Great Britain _____ Nov. 9, 1960